March 17, 1931.  M. H. JOHANSON  1,796,462
METHOD OF AND MACHINE FOR PRODUCING GEARS
Filed March 8, 1928
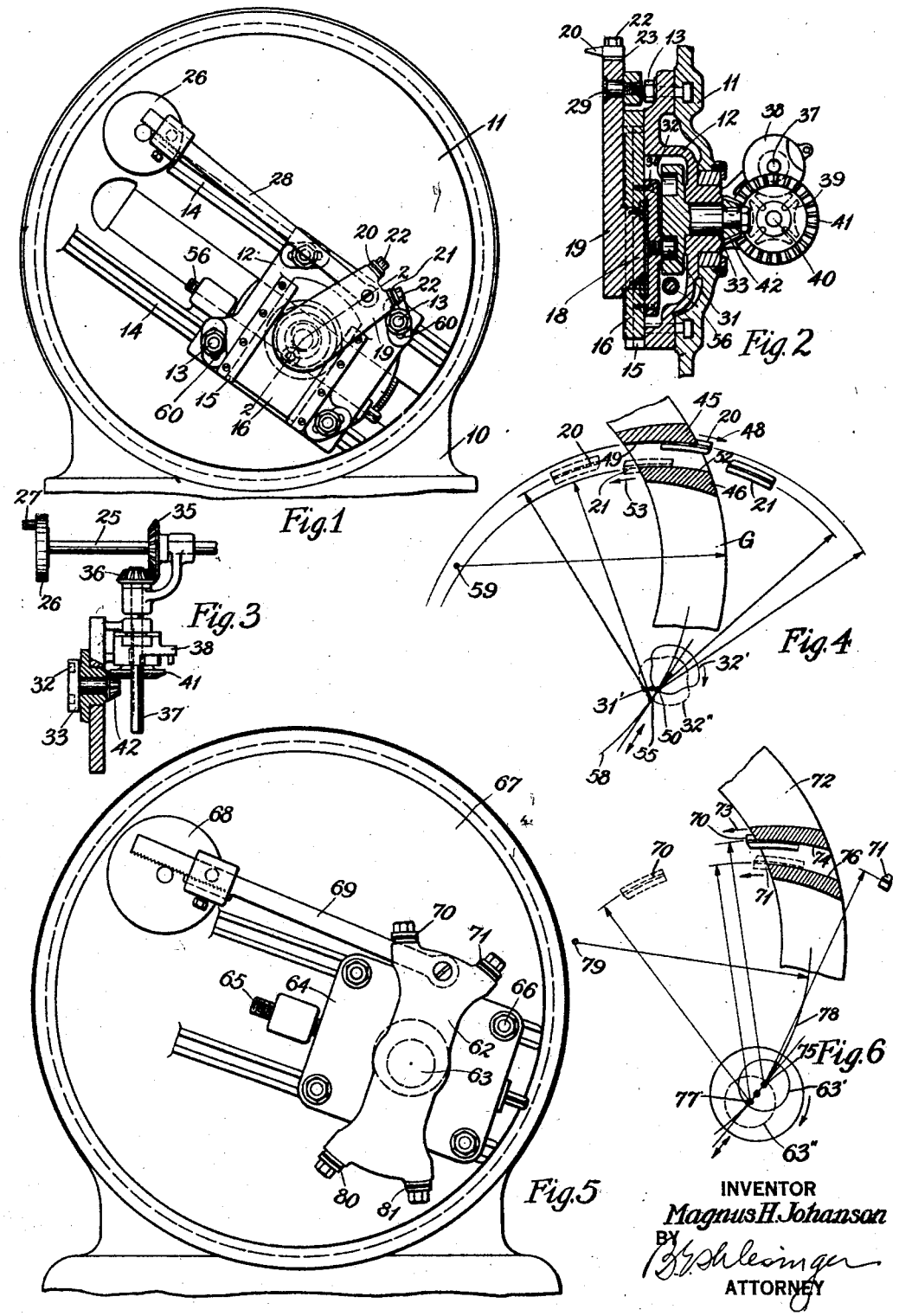
INVENTOR
Magnus H. Johanson
BY
ATTORNEY Patented Mar. 17, 1931

1,796,462

UNITED STATES PATENT OFFICE

MAGNUS H. JOHANSON, OF ROCHESTER, NEW YORK, ASSIGNOR TO GLEASON WORKS, OF ROCHESTER, NEW YORK, A CORPORATION OF NEW YORK

METHOD OF AND MACHINE FOR PRODUCING GEARS

Application filed March 8, 1928. Serial No. 260,232.

The present invention relates to gear cutting and particularly to a method and machine for producing longitudinally curved tooth gears.

The primary purpose of this invention is to provide a two-tool reciprocating type curved tooth gear cutting machine in which the tools are moved clear of the blank on their idle return stroke without requiring a complicated clapping mechanism.

A further object of this invention is to provide a machine for cutting longitudinally curved tooth gears in which the tools may be simultaneously adjusted to cut the opposite side tooth faces of the blank successively from different centers.

Other objects of the invention will be apparent hereinafter from the specification and from the appended claims.

The present invention is capable of being practiced in various ways and by means of various constructions. For the purpose of illustration, two possible embodiments of the invention are illustrated in the accompanying drawings and described hereinafter. It will be understood, however, that while particular embodiments of the invention, relating both to method and machine, may be described, the invention is capable of further modification within its scope and the limits of the appended claims.

In the drawings:

Figure 1 is a front elevation of the tool end of a gear cutting machine constructed according to this invention;

Figure 2 is an enlarged section on the line 2—2 of Figure 1;

Figure 3 is a diagram of the tool drive;

Figure 4 is a diagrammatic view illustrating the method of operation of the machine illustrated in Figures 1, 2 and 3;

Figure 5 is a front elevation of a machine constructed according to a further embodiment of this invention; and Figure 6 is a diagrammatic view illustrating the method of operation of this latter embodiment.

According to the present invention, an oscillating motion is imparted to the tools and at the end of each stroke, the tools are shifted toward and away from the tooth surfaces being cut to move the tools, respectively, into and out of engagement with these tooth surfaces alternately. The intermittent shifting motion of the tools takes the place of the clapping motion ordinarily employed where reciprocating tools are used and eliminates the costly clapping mechanism which would otherwise be required. Preferably, the two tools for cutting the opposite side tooth surfaces of the blank are so arranged relatively to each other that when one tool is moved by this shifting motion into cutting position for cutting one tooth face of the blank the other tool is moved clear of the opposite side tooth face of the blank.

Referring now to the drawings by numerals of reference. 10 indicates the base or frame of a gear cutting machine constructed according to this invention and provided with circular ways within which is rotatably mounted a cradle or tool carrier 11. Mounted on the cradle 11 for adjustment thereon is a plate 12 which may be secured in any adjusted position by means of the T-bolts 13 which engage in T-slots 14 formed in the face of the cradle. The plate 12 is provided with guide-ways 15 in which moves a reciprocable slide 16.

The slide 16 is provided with a bearing for the stud 18 of an oscillatable tool arm 19 which is thus journaled on said slide 16.

The tool arm 19 carries a pair of cutting tools 20 and 21 which are so sharpened as to cut, respectively, opposite side tooth faces of a gear blank. These tools are secured to the arm 19 by means of the bolts 22. Shims 23 are provided for varying the radial distances of the cutting edges of these tools from the axis of the stud 18 on which the arm 19 swings. These shims 23 serve also to adjust the cutting blades to take up for wear.

Journaled in the cradle 11 is a shaft 25 (Fig. 3) to which is secured a crank disc 26. This crank disc is connected by the pin 27, connecting rod 28 and screw 29 with the tool arm 19. Through this mechanism, an oscillating motion is imparted to the arm 19 moving the tools back and forth across the face of the blank. The crank is driven continuously while the machine is in operation.

Secured to the rear of the slide 16 is a disc 30 which carries a roller 31 that engages in a groove 32 of a cam 33. This cam is journaled in a suitable bearing formed integral with the plate 12.

The cam is given a rotary movement intermittently through half a revolution to shift the slide 16 back and forth in the guide ways 15 to move the tools 20 and 21 alternately into cutting position and to clear these tools alternately from the opposite side faces of the blank which they are adapted, respectively, to cut. A layout of the cam groove 32 in its two positions is shown in full lines and in dotted lines at 32' and 32", respectively in Figure 4. The cam 33 is rotated intermittently from the shaft 25 through the mechanism illustrated more particularly in Figure 3. This includes a bevel gear 35 keyed to the shaft 25 which meshes with a bevel pinion 36 mounted on the splined shaft 37. This splined shaft carries, also, the driving member 38 of an intermittent mechanism, the driven member 39 of which is secured to a shaft 40 which is also splined and carries a bevel gear 41 that meshes with and drives the bevel pinion 42 which is keyed to the shaft of the cam 33.

The shaft 25 may be driven from any suitable source of power. The gearing between the shaft 25 and the cam 33 is so coordinated that the cam 33 is given an intermittent movement of half a revolution at either end of the stroke of the oscillating arm 19.

The operation of the mechanism so far described will be clear from Figure 4. In the mechanism of Figures 1 and 2, the tools 20 and 21 are arranged, respectively, to cut on movement of the arm 19 in opposite directions so that one tool cuts while the arm is moving in one direction and the other tool cuts while the arm is moving in the opposite direction. Thereby any loss of cutting time is avoided. G indicates a portion of a gear blank being cut upon the machine. Two teeth 45 and 46 are shown. In the arrangement of the diagram the tools 20 and 21 are spaced apart radially a distance less than the width of the groove between adjacent teeth of the gear. The tools 20 and 21 are shown in full lines in Fig. 4 in the position they have when the arm 19 is moving in the direction of the arrow 48 and the tool 20 is operating upon the side tooth surface 49 of a tooth 45. While the tool 20 is cutting, the cam groove has the position 32' and the cam roller the position 31'. The tooth side 49 is thus cut along a circular arc curved about the center 50.

At the end of the stroke of the arm 19 in the direction of the arrow 48, the intermittent mechanism acts to rotate the cam 33 through half a revolution to move the cam path to the position 32" shifting the slide 16 to its lower position, moving the tool 20 clear of the tooth side 49 and bringing the tool 21 into position to cut the side 52 of the tooth 46 on oscillation of the arm 19 in the opposite direction. The tooth side 52 is then cut along a circular arc 55 spaced from the center 50 about which the opposite tooth sides 49 of the teeth are cut. The intermittent mechanism locks the slide 16 against movement during either cutting stroke, though if desired an additional auxiliary locking means of any suitable nature may be provided.

At the end of the movement of the arm 19 in the direction of the arrow 53, the intermittent mechanism again rotates the cam 33 through half a revolution bringing the cam groove back to the full line position 32' moving the tool 21 clear of the tooth side 52 and bringing the tool 20 into position where on the return stroke of the arm 19 in the direction of the arrow 48, this tool 20 will again cut upon the tooth surface 49.

After a pair of side tooth surfaces of the blank have been completed by cutting in the manner described, the blank will be indexed and the next pair of tooth surfaces cut, the operation proceeding until the blank is completed.

The tools can be adjusted to cut gears of any desired spiral angle by adjusting the cradle 11 on its axis and the plate 12 laterally on the cradle. This last adjustment may be effected by the screw 56. To keep the centers 50 and 55 about which the tools swing on the same circle 58 which is circumscribed about the apex 59 of the crown gear as a center the plate 12 may be provided, as shown, with arcuate slots 60 curved about the axis of the stud 18 as a center. The bolts 13 can be passed through the slots 60 to secure the plate 12 in any position of its angular and lateral adjustment with reference to the cradle 11.

Another embodiment of the invention is illustrated in Figures 5 and 6. Here the tool arm 62 is mounted upon an eccentric 63 which is journaled in the plate 64. The plate 64 is adjustable on the cradle 11 by means of the screw 65 and may be secured in any adjusted position by means of the bolts 66. The tool arm 62 is oscillated by means of a crank 68 and a connecting rod 69. The crank 68 rotates continuously while the machine is in operation.

The eccentric 63 is intermittently rotated to bring the tools 70 and 71 alternately into cutting position and to clear these tools alternately from the tooth sides which they cut. In this embodiment of my invention, the tools 70 and 71 are spaced apart circumferentially a distance equal at least to the width of face to the gear 72 to be cut, and in this case the tools cut while moving in the same direction.

The operation of this embodiment of my invention is illustrated in Figure 6. The full line positions of the tools 70 and 71 indicate their positions when the tool 70 is cutting. Part of the tool 71 is broken away to keep it within the boundary lines of the drawing. The arm 62 is moving in the direction of the arrow 73 and the tool 71 is clear of the blank. The eccentric is in the upper full line position 63' and the tooth side 74 is thus cut about a center 75. After the tool 70 has finished its cut and moved clear of the blank, the eccentric 63 is rotated half a revolution to bring it into the lower dotted line position 63''. This shifts the tools 70 and 71 and brings the tool 71 into cutting position whereon the continued movement of the arm 62 in the direction of the arrow 73, the tooth side 76 will be cut. The relative positions of the tools 70 and 71 during the cutting of the tooth side 76 are indicated in dotted lines in Fig. 6. It will be seen that the tooth side 76 is cut about a center 77 different from the center 75, both centers lying, however, on the same circle 78 circumscribed about the crown gear center 79 as a center.

At the completion of the stroke of the arm 62 in the direction of the arrow 73, the eccentric 63 is again rotated through half a revolution to shift the tool arm 62 upwardly bringing the tools back to the position where they again move about the center 75. Thus the tool 71 is moved clear of the side 76 and as the arm 62 moves on its return stroke in the direction opposite to the arrow 73, the tool 71 clears the blank. After the tool 71 has moved across the face of the blank, the intermittent mechanism again comes into operation and rotates the eccentric 63 through another half a revolution to bring it back to the position 63'' to move the tool 70 clear of the blank for the remainder of the return stroke of the arm 62. After the tool 70 has moved across the face of the blank on its return stroke, the eccentric 63 is again rotated through half a revolution to the postion 63' and the cycle commences anew with the tool arm 62 again travelling in the direction of the arrow 73.

The eccentric 63 may be rotated by an intermittent mechanism similar to that shown in Figures 2 and 3 with the exception that the gearing will be so arranged that the eccentric 63 makes two complete revolutions in one revolution of the crank 68. It will be understood, of course, that the intermittent mechanism acts to lock the eccentric against movement after each of the four intermittent half rotations which cause it to complete two revolutions in a cycle of operation of the machine. If desired, however, an auxiliary locking means may be employed. After two tooth sides of the blank have been completed, the blank may be indexed and the operation proceeds as before, although in this embodiment, as also in the embodiment of Figure 1, the blank may be indexed between each successive cycle of operation of the tool arms so that all the teeth of the blank may be completed simultaneously.

It will be understood, of course, that the tools 70 and 71 might be arranged to cut in opposite directions in the manner similar to the tools 20 and 21.

It is possible to make the tool arm bi-lateral as shown in Fig. 5 so that an additional pair of tools 80 and 81 may be provided. These tools are diametrically opposed to the tools 70 and 71 and may be employed in cutting gears of a different hand of spiral from the gears to be cut with the tools 70 and 71. Through this arrangement, the same machine can be used to cut gears of both right and left hand spiral teeth.

While in both embodiments illustrated, I have shown the tools secured to an oscillating arm which is intermittently shifted to bring the tools alternately into and out of engagement with opposite side tooth faces of the blank, my invention might be employed, also, in a construction where the center about which the tools oscillate is fixed and the tools themselves are mounted on a slide which is shifted radially back and forth on the oscillating arm. Where such an embodiment of my invention is employed, the opposite side tooth faces of the blank can be cut from a common center.

The invention may be employed in grinding and for roughing as well as finishing either in a generating or a forming operation. While two embodiments of the invention have been shown, it will be understood that the invention is capable of various further modifications and that this application is intended to cover any adaptations, uses, or embodiments of my invention, following, in general, the principles of the invention and including such departures from the present disclosure as may come within known or customary practise in the gear art and as may be applied to the essential features hereinbefore set forth and as fall within the scope of the invention or the limits of the appended claims.

Having thus described my invention, what I claim is:

1. In a machine for producing longitudinally curved tooth gears, a blank support, a tool, means for oscillating the tool to move it back and forth in a longitudinally curved path and means for giving the tool a relative movement of engagement and clearance in a direction substantially perpendicular to the direction of its oscillating movement to operate on a side tooth surface of the blank during oscillation of the tool in one direction and to clear said surface during movement in the opposite direction.

2. In a machine for producing longitudinally curved tooth gears, a blank support, a pair of tools adapted to cut opposite side tooth faces of the blank, means for oscillating said tools to move them back and forth across the face of the blank and means for giving each of said tools an alternate relative movement of engagement and clearance in a direction substantially perpendicular to the direction of their oscillating movements to cause each tool to operate on one side face of the blank during its movement in one direction and to clear said face during its movement in the opposite direction.

3. In a machine for producing longitudinally curved tooth gears, a blank support, a pair of tools adapted to cut opposite side tooth faces of the blank and arranged to cut on movement in opposite directions, means for oscillating said tools to move them back and forth across the face of the blank, and means for moving said tools simultaneously in opposite directions in a line substantially perpendicular to the path of the tools to bring the tools alternately into cutting engagement with the respective tooth sides to be cut by said tools and to clear said tooth sides alternately.

4. In a machine for producing longitudinally curved tooth gears, a blank support, a tool carrier, a tool support oscillatably mounted on said carrier, a tool mounted on said tool support, means for oscillating said tool support to move the tool in a curved path across the face of the blank, and means for moving the tool carrier alternately in opposite directions in a line substantially perpendicular to the side tooth surface being cut to bring the tool into cutting engagement with the tooth surface of the blank during oscillation of the tool support in one direction, and to clear said tool of said tooth side on the return movement of said tool support.

5. In a machine for producing longitudinally curved tooth gears, a blank support, a tool carrier, a tool support oscillatably mounted on said carrier, a pair of tools mounted on said tool support and adapted to operate on opposite side tooth faces of the blank, means for oscillating said tool support to move the tools across the face of the blank, and means for shifting said tool carrier back and forth intermittently to cause the tools to engage and clear the tooth sides on which each operate alternately.

6. In a machine for producing longitudinally curved tooth gears, a blank support, a tool carrier, a tool support oscillatably mounted on said carrier, a pair of tools mounted on said tool support and adapted to operate upon opposite side tooth faces of the blank and arranged to cut while moving in opposite directions, means for oscillating said tool support to move the tools across the face of the blank, and means for moving the tool carrier in opposite directions to cause the tools to operate upon and clear the tooth sides which they are adapted, respectively, to cut, alternately, one tool being in cutting engagement while the other tool is clear.

7. In a machine for producing longitudinally curved tooth gears, a blank support, a pair of tools adapted to cut opposite side tooth faces of the blank, means for oscillating the tools to cut longitudinally curved tooth faces on the blank and means for shifting the axis about which said tools oscillate to cause the tools to cut the opposite side tooth faces of the blank alternately from different centers.

8. The method of producing a gear which consists in oscillating a tool to cut longitudinally curved tooth faces on the blank and giving said tool at opposite ends of its stroke a relative bodily movement alternately in opposite directions in a direction substantially perpendicular to the axis about which said tool swings so the tool will operate on a side tooth surface of the blank during movement in one direction and clear said tooth surface in its return movement.

9. The method of producing a gear which consists in imparting an oscillating movement to a pair of tools adapted to cut opposite side tooth faces of the blank to cut longitudinally curved teeth and giving said tools alternately a movement of engagement and clearance in a direction substantially radial of the axis about which the tools swing to move the tools into and out of engagement alternately with the tooth sides cut thereby, one tool being moved into engagement with a tooth side while the other tool is simultaneously being moved away from the opposite tooth side.

10. The method of producing a gear which consists in imparting an oscillatory movement to a pair of tools adapted to cut opposite side tooth faces of the blank while moving in opposite directions to cut longitudinally curved teeth on the blank and shifting the axis about which the tools oscillate to give the tools an alternate movement of engagement and clearance with reference to the tooth sides to be cut thereby, one tool being moved into engagement with a tooth side of the blank while the other tool is being moved away from the opposite tooth side.

11. In a machine for producing longitudinally curved tooth gears, a blank support, a tool carrier, a pair of tools mounted on said carrier adapted to cut, respectively, opposite side tooth faces of the blank, means for oscillating said carrier to move the tools in longitudinally curved paths, and means for moving the carrier alternately in opposite directions in a line substantially perpendicular to the tool paths to move the tools alternately into and out of engagement with the respective tooth sides to be cut thereby.

12. In a machine for producing longitudinally curved tooth gears, a blank support, a pivotally mounted tool carrier, a pair of tools mounted on said carrier adapted to cut, respectively, opposite side tooth faces of the blank, means for oscillating said carrier about its pivot to move the tools in longitudinally curved paths, and means for moving the pivot about which the carrier swings alternately in opposite directions in a line substantially radial of said pivot to move the tools alternately into and out of engagement with the respective tooth sides to be cut thereby.

13. In a machine for producing gears, a work support, a tool having a side cutting edge, means for reciprocating the tool to impart cutting and return movements thereto, and means for moving the tool transversely of its side cutting edge alternately in opposite directions at opposite ends of its stroke to move the tool alternately to and from cutting position.

14. In a machine for producing gears, a work support, a tool having a side cutting edge, means for oscillating the tool to impart alternate cutting and return movements thereto, and means for moving the tool transversely of its side cutting edge alternately in opposite directions at opposite ends of its stroke to move the tool alternately to and from cutting position.

15. In a machine for producing gears, a work support, a pair of tools having side cutting edges adapted to cut opposite side tooth faces of a gear blank, means for reciprocating the tools to impart alternate cutting and return movements thereto, and means for moving the tools bodily together in a direction transverse to their cutting edges alternately in opposite directions at opposite ends of the reciprocating movement to move alternately one tool into cutting position and simultaneously withdraw the other therefrom.

16. In a machine for producing gears, a work support, a pair of tools having side cutting edges adapted to cut opposite side tooth faces of a gear blank, means for oscillating the tools to move them in longitudinally curved paths and means for moving the tools bodily together in opposite directions at opposite ends of their oscillatory movement in a direction transverse to their cutting edges to move alternately one tool into cutting position and simultaneously withdraw the other therefrom.

17. The method of producing a gear which consists in oscillating a tool to move it in a longitudinally curved path and giving said tool a relative bodily movement of engagement and clearance alternately in a direction transverse of its cutting edge to cause it to cut on oscillation in one direction and clear the work on its return stroke.

18. The method of producing a gear which consists in oscillating a pair of tools adapted to cut opposite side tooth faces of a gear blank to cause said tools to cut longitudinally curved teeth in the blank and moving said tools bodily together alternately in opposite directions in a direction transverse of their cutting edges to move the tools alternately to and from cutting position at opposite ends of their oscillating movement.

MAGNUS H. JOHANSON.